Patented Aug. 2, 1938

2,125,412

UNITED STATES PATENT OFFICE 2,125,412

PROCESS FOR HYDROGENATING POLY-NUCLEAR AROMATIC KETONES

Herrick R. Arnold and Crawford H. Greenewalt, Wilmington, Del., assignors to E. I. du Pont de Nemours & Company, Wilmington, Del., a corporation of Delaware No Drawing. Application August 26, 1936, Serial No. 98,074

19 Claims. (Cl. 260—154)

This invention relates to liquid phase catalytic hydrogenation and more particularly to the hydrogenation of anthraquinones to dihydroanthracenes and to the hydrogenation of benzanthrone to dihydrobenzanthranol.

Anthraquinones have been hydrogenated with nickel and platinum catalysts; however, only low yields of dihydroanthracenes were obtained.

This invention has as its object the preparation in good yields of dihydroanthracenes and dihydrobenzanthranol by the catalytic hydrogenation of anthraquinones and benzanthrone.

The above object is accomplished by the hydrogenation of anthraquinone and benzanthrone in an inert solvent in the liquid phase with a chromite catalyst under superatmospheric pressure and at elevated temperatures. By varying the conditions during hydrogenation the course of the reaction can be so altered that in the final product either the anthranols or the hydroanthracenes predominate. The preferred embodiments of this invention are set forth in the following examples.

*Example I.*—A barium modified copper chromite catalyst was prepared as follows: To a solution consisting of 52 g. of barium nitrate and 436 g. of copper nitrate trihydrate dissolved in 1,600 cc. of water, there was added with stirring a second solution consisting of 252 g. of ammonium bichromate and 300 cc. of 28% ammonium hydroxide dissolved in 1,200 cc. of water. The precipitate of mixed chromates was filtered, dried, and ignited at 400° C. for four hours. The resulting mixed chromites were then extracted with dilute acetic acid, washed, dried, and powdered.

One hundred grams of anthraquinone, 100 g. of toluene, and 10 g. of the above catalyst were charged into a pressure autoclave. Compressed hydrogen was then introduced until a pressure of 1,500 pounds per square inch was obtained. The reaction mixture was heated to 220° C. with constant shaking and the hydrogen pressure built up to 3,000 pounds per square inch. Hydrogenation was complete in 10 minutes and the contents discharged after cooling. The suspension was heated to boiling and the catalyst filtered out. On cooling a 40% yield of dihydroanthracene, M. P. 108° C., crystallized and further treatment of the residue with dilute caustic solution to remove anthranols gave an additional 20% of product.

*Example II.*—One hundred grams of 2-methyl anthraquinone, 100 g. of toluene, and 10 g. of copper-chromium-barium catalyst, prepared as described in Example I, were heated to 230° C. under 2,000 to 3,000 pounds per square inch hydrogen pressure with good agitation in a steel pressure tube. Hydrogen absorption ceased in 5 to 10 minutes and the cooled contents of the tube were discharged. The catalyst was filtered out of the solution and the filtrate evaporated to dryness. One recrystallization of the resulting solid from methanol gave a 60% yield of dihydro-methyl anthracene, M. P. 52° C., which analyzed correctly for carbon and hydrogen content.

*Example III.*—A copper chromite hydrogenation catalyst was prepared by dissolving 428 g. of copper nitrate and 176 g. of chromic anhydride ($CrO_3$) in 2,750 cc. of water. To this solution 85 grams of anhydrous ammonia was added with stirring in order to precipitate copper-ammonium chromate. The precipitate was filtered, dried, ignited at 425° to 450° C., and then extracted with 10% acetic acid solution. After washing and drying, the metallic chromite catalyst was screened 18 mesh.

Into a small autoclave were charged 75 g. of benzanthrone, 75 g. of decahydronaphthalene, and 10 g. of the above catalyst. While shaking, the contents were heated to 175° C. under 1,500 pounds per square inch hydrogen pressure. Hydrogenation was complete in a few minutes at 1,000 to 3,000 pounds per square inch hydrogen pressure. From the product there crystallized 32 grams of dihydrobenzanthranol, M. P. 148° C., thus giving a yield of 42.6%.

*Example IV.*—Ten grams of the catalyst described in Example I, 75 g. of benzanthrone, and 75 g. of decahydronaphthalene were introduced into an autoclave. While shaking, the contents were heated to a temperature of 130° to 140° C. under a hydrogen pressure of 1,000 to 3,000 pounds per square inch. After hydrogenation was complete 54 g. of crude dihydrobenzanthranol was isolated. Thus crude product on further recrystallization from alcohol and benzene gave 31 g. of pure product. This represents nearly a 50% yield.

*Example V.*—A modified copper chromite catalyst was prepared as follows: 23 g. of cadmium nitrate, 24 g. of copper nitrate, and 243 g. of zinc nitrate were dissolved in 500 cc. of water and mixed at ordinary temperature with an equal volume of water containing 126 g. of ammonium bichromate and 75 cc. of 28% ammonium hydroxide. After stirring, the mixture was exactly neutralized with additional ammonium hydroxide and allowed to settle. After several washes by decantation the precipitate was dried and ignited at 400° C.

Ten grams of this zinc-copper-cadmium chromite catalyst, 100 g. of benzanthrone and 100 g. of toluene were placed in the high pressure tube and heated to 225° C. with good agitation. Hydrogenation was complete in approximately 15 minutes under a hydrogen pressure of 2,000 to 3,000 pounds per square inch. The product was dissolved in boiling toluene and the catalyst filtered off. When the toluene was cooled in ice, 35 g. of dihydrobenzanthranol separated, or nearly a 35% yield.

In the above examples certain conditions of pressure, temperature, solvent, etc., are indicated which may be varied within the scope of this invention. The pressure of hydrogen may vary from 20 to 300 atmospheres and the temperatures from 120° to 250° C. The preferred pressure would be approximately 170 atmospheres and the preferred temperatures 150° to 170° C. In some cases an exothermic reaction occurs and the temperature will automatically rise to 230° to 240° C. A temperature above 250° C. is not desirable in the case of benzanthrone since water is eliminated from the dihydrobenzanthranol and ring hydrogenation begins.

As indicated in the examples success has attended the use of the chromites of one or more hydrogenating metals. The amount of catalyst may vary from 2% to 10% depending on the other variables such as pressure, temperature, agitation, etc.

The high melting point of the materials hydrogenated makes preferable the use of a solvent, if not actually requiring one. While hydrocarbons are used in the examples, any solvent can be used which is inert toward the materials hydrogenated and preferably will not hydrogenate under the conditions employed although inert solvents that hydrogenate during the reaction may be used. Other solvents which may be mentioned are dioxane, dibutyl ether, alkyl ethers of ethylene glycol, and alcohols.

By means of this invention anthraquinone derivatives may be hydrogenated to the dihydroanthracenes with a minimum of side products, particularly those materials which are more completely saturated. The process is simpler as compared with the use of nickel in that the hydrogenation is largely self-limiting and does not require careful control of the hydrogen absorption nor of temperature.

In the case of benzanthrone this invention provides a method for the preparation of dihydrobenzanthrol which does not require careful temperature control and which can be operated with a catalyst less expensive than nickel.

As many apparently widely different embodiments of this invention may be made without departing from the spirit and scope thereof, it is to be understood that it is not intended to be limited except as indicated in the appended claims.

We claim:

1. The process for the catalytic hydrogenation of the keto group of an aromatic ketone having at least three benzene rings and characterized in that the keto group is a nuclear keto group with the minimum hydrogenation of the nucleus of said aromatic ketone, which comprises catalytically hydrogenating in the liquid phase said aromatic ketone at a temperature between 120° C. and 250° C. and at a pressure between 20 and 300 atmospheres, while in contact with a chromite catalyst.

2. The process in accordance with claim 1 characterized in that the reaction is carried out in the presence of a copper-containing chromite catalyst.

3. The process in accordance with claim 1 characterized in that the catalyst is copper chromite.

4. The process in accordance with claim 1 characterized in that the catalyst is a barium-copper-chromite catalyst.

5. The process in accordance with claim 1 characterized in that the reaction is carried out at a pressure of about 170 atmospheres.

6. The process in accordance with claim 1 characterized in that the reaction is carried out at a temperature of about 150° to about 170° C.

7. The process in accordance with claim 1 characterized in that the aromatic ketone is anthraquinone.

8. The process in accordance with claim 1 characterized in that the aromatic ketone is benzanthrone.

9. The process in accordance with claim 1 characterized in that the aromatic ketone is an alkyl-substituted anthraquinone.

10. The process in accordance with claim 1 characterized in that the aromatic ketone is 2-methyl anthraquinone.

11. The process for the production of a hydrocarbon as the major product, which comprises reacting hydrogen with an anthraquinone in solution in an inert solvent while in contact with a chromite catalyst at a temperature between 120° and 250° C. and at a pressure between 20 and 300 atmospheres.

12. The process in accordance with claim 11 characterized in that the inert solvent is toluene.

13. The process for the production of dihydroanthracene, which comprises reacting hydrogen with anthraquinone in solution in toluene, while in contact with a barium-copper-chromite catalyst, at a temperature of about 220° C. and at a pressure of about 1,500 to about 3,000 pounds per square inch.

14. The process for the production of the hydroxy compound as a major product, which comprises reacting hydrogen with a benzanthrone in solution in an inert solvent, while in contact with a chromite catalyst, at a temperature between 120° and 250° C. and at a pressure between 20 and 300 atmospheres.

15. The process in accordance with claim 14 characterized in that the inert solvent is decahydronaphthalene.

16. The process for the production of dihydrobenzanthranol which comprises reacting hydrogen with benzanthrone in solution in decahydronaphthalene, while in contact with a barium-copper-chromite catalyst, at a temperature of about 130° to about 140° C. and at a pressure of about 2,000 pounds per square inch.

17. The process for the production of a hydrocarbon as a major product, which comprises reacting hydrogen with 2-methyl anthraquinone in solution in an inert solvent, while in contact with a chromite catalyst, at a temperature between 120° and 250° C. and at a pressure between 20 and 300 atmospheres.

18. The process in accordance with claim 17 characterized in that the inert solvent is toluene.

19. The process for the production of dihydromethyl anthracene which comprises reacting hydrogen with 2-methyl anthraquinone in solution in toluene, while in contact with a barium-copper-chromite catalyst, at a temperature of about 230° C. and at a pressure of about 2,000 to about 3,000 pounds per square inch.

HERRICK R. ARNOLD.
CRAWFORD H. GREENEWALT.